(12) United States Patent
Custodio et al.

(10) Patent No.: US 11,972,298 B2
(45) Date of Patent: Apr. 30, 2024

(54) TECHNOLOGIES FOR DATA MIGRATION BETWEEN EDGE ACCELERATORS HOSTED ON DIFFERENT EDGE LOCATIONS

(71) Applicant: Intel Corporation, Santa Clara, CA (US)

(72) Inventors: Evan Custodio, North Attleboro, MA (US); Francesc Guim Bernat, Barcelona (ES); Suraj Prabhakaran, Aachen (DE); Trevor Cooper, Portland, OR (US); Ned M. Smith, Beaverton, OR (US); Kshitij Doshi, Tempe, AZ (US); Petar Torre, Feldkirchen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/666,366

(22) Filed: Feb. 7, 2022

(65) Prior Publication Data

US 2022/0237033 A1 Jul. 28, 2022

Related U.S. Application Data

(63) Continuation of application No. 16/369,036, filed on Mar. 29, 2019, now Pat. No. 11,243,817.

(51) Int. Cl.
*G06F 3/06* (2006.01)
*G06F 8/30* (2018.01)
(Continued)

(52) U.S. Cl.
CPC ............ *G06F 9/505* (2013.01); *G06F 9/5044* (2013.01); *G06F 9/5083* (2013.01); *G06F 2209/509* (2013.01)

(58) Field of Classification Search
CPC ...... G06F 9/505; G06F 9/5044; G06F 9/5083; G06F 2209/509; G06F 9/4843
See application file for complete search history.

(56) References Cited

U.S. PATENT DOCUMENTS

| 6,148,261 A * | 11/2000 | Obradovich ....... G01C 21/3667 701/461 |
| 6,772,230 B2 * | 8/2004 | Chen ................ H03K 19/17748 326/38 |

(Continued)

OTHER PUBLICATIONS

Gezer et al., "An Introduction to Edge Computing and a Real-Time Capable Server Architecture," International Journal on Advances in Intelligent Systems, vol. 11, No. 1 & 2, Jul. 17, 2018, 11 pages.

(Continued)

*Primary Examiner* — Kevin T Bates
*Assistant Examiner* — Golam Mahmud
(74) *Attorney, Agent, or Firm* — HANLEY, FLIGHT & ZIMMERMAN, LLC

(57) ABSTRACT

Technologies for migrating data between edge accelerators hosted on different edge locations include a device hosted on a present edge location. The device includes one or more processors to: receive a workload from a requesting device, determine one or more accelerator devices hosted on the present edge location to perform the workload, and transmit the workload to the one or more accelerator devices to process the workload. The one or more processor is further to determine whether to perform data migration from the one or more accelerator devices to one or more different edge accelerator devices hosted on a different edge location, and send, in response to a determination to perform the data migration, a request to the one or more accelerator devices on the present edge location for transformed workload data to be processed by the one or more different edge accelerator devices.

24 Claims, 5 Drawing Sheets

(51) Int. Cl.
  *G06F 8/41* (2018.01)
  *G06F 9/50* (2006.01)
  *G06F 11/00* (2006.01)
  *G06F 11/20* (2006.01)
  *G06F 21/62* (2013.01)

(56) References Cited

U.S. PATENT DOCUMENTS

| | | | |
|---|---|---|---|
| 7,706,255 B1* | 4/2010 | Kondrat | H04L 47/32 |
| | | | 370/219 |
| 8,112,475 B2* | 2/2012 | Tran | H04W 76/15 |
| | | | 455/418 |
| 8,155,901 B2* | 4/2012 | Wang | H02J 3/242 |
| | | | 340/657 |
| 9,082,134 B2* | 7/2015 | Gishen | G06Q 30/0261 |
| 9,537,973 B2* | 1/2017 | Batrouni | H04L 67/101 |
| 10,085,358 B2* | 9/2018 | Adiletta | H03M 7/3086 |
| 10,095,521 B2* | 10/2018 | Ben-Kiki | G06F 9/30076 |
| 10,127,012 B2* | 11/2018 | Howard | G06F 13/1673 |
| 10,158,911 B1* | 12/2018 | Sengupta | G06F 16/951 |
| 10,244,071 B2 | 3/2019 | Moustafa et al. | |
| 10,310,908 B2* | 6/2019 | Fong | G06F 9/5044 |
| 10,437,616 B2* | 10/2019 | Agarwal | G06F 9/505 |
| 10,440,096 B2 | 10/2019 | Sabella et al. | |
| 10,678,444 B2* | 6/2020 | Huang | G06F 16/256 |
| 10,831,555 B2* | 11/2020 | Krishnan | G06F 9/45558 |
| 10,838,902 B2* | 11/2020 | Vijayrao | G06F 15/7803 |
| 10,853,207 B2* | 12/2020 | Zhao | G06F 11/1666 |
| 11,204,747 B1* | 12/2021 | Zejda | G06N 3/02 |
| 11,243,817 B2 | 2/2022 | Custodio et al. | |
| 2011/0016214 A1* | 1/2011 | Jackson | G06F 9/505 |
| | | | 718/101 |
| 2011/0225298 A1* | 9/2011 | Brown | G06F 9/505 |
| | | | 709/226 |
| 2011/0282841 A1* | 11/2011 | Saika | G06F 16/128 |
| | | | 707/649 |
| 2014/0259109 A1 | 9/2014 | Houston et al. | |
| 2015/0163302 A1* | 6/2015 | Armstrong | H04L 67/1097 |
| | | | 709/217 |
| 2016/0019273 A1* | 1/2016 | Bowman | H04L 67/125 |
| | | | 707/811 |
| 2016/0192151 A1* | 6/2016 | Marri Sridhar | H04W 4/20 |
| | | | 455/418 |
| 2016/0306701 A1* | 10/2016 | Heil | G06F 11/1441 |
| 2016/0321081 A1 | 11/2016 | Kim et al. | |
| 2016/0342419 A1 | 11/2016 | Oren-Kiki et al. | |
| 2016/0344781 A1* | 11/2016 | Gyimesi | H04L 65/612 |
| 2017/0026463 A1* | 1/2017 | Lee | G06F 9/5055 |
| 2017/0264680 A1* | 9/2017 | Palermo | G06F 30/331 |
| 2018/0024861 A1 | 1/2018 | Balle et al. | |
| 2018/0034924 A1* | 2/2018 | Horwood | H04L 67/34 |
| 2018/0081804 A1* | 3/2018 | Turner | G06F 9/5083 |
| 2018/0181439 A1* | 6/2018 | Jackson | G06F 9/5083 |
| 2018/0183855 A1 | 6/2018 | Sabella et al. | |
| 2018/0232254 A1* | 8/2018 | Mohan | G06F 3/0632 |
| 2018/0352051 A1* | 12/2018 | Tsai | H04L 67/60 |
| 2019/0012218 A1* | 1/2019 | Rimac | G06F 9/546 |
| 2019/0014171 A1* | 1/2019 | Stein | G06F 9/5027 |
| 2019/0028552 A1* | 1/2019 | Johnson, II | H04L 67/146 |
| 2019/0042955 A1* | 2/2019 | Cahill | G06N 5/04 |
| 2019/0045409 A1* | 2/2019 | Rasanen | H04W 36/12 |
| 2019/0065083 A1* | 2/2019 | Sen | H04L 67/1008 |
| 2019/0098474 A1* | 3/2019 | Zhu | H04W 16/18 |
| 2019/0104182 A1* | 4/2019 | Elzur | H04L 67/125 |
| 2019/0104438 A1* | 4/2019 | Mittal | H04W 99/00 |
| 2019/0108259 A1* | 4/2019 | Rabbah | G06F 16/953 |
| 2019/0121671 A1 | 4/2019 | Guim Bernat | |
| 2019/0158606 A1* | 5/2019 | Guim Bernat | H04W 40/20 |
| 2019/0181911 A1* | 6/2019 | Schulz | H04B 3/237 |
| 2019/0213050 A1* | 7/2019 | Fredrickson | G06F 12/1045 |
| 2019/0243685 A1 | 8/2019 | Guim Bernat et al. | |
| 2020/0073633 A1* | 3/2020 | Jacobi | G06F 7/02 |
| 2020/0169856 A1* | 5/2020 | Yang | H04L 67/1008 |
| 2020/0196203 A1* | 6/2020 | Yang | H04W 36/14 |
| 2022/0237033 A1 | 7/2022 | Custodio et al. | |

OTHER PUBLICATIONS

Nallur et al., "A Decentralized Self-Adaptation Mechanism for Service-Based Applications in the Cloud," IEEE Transactions on Software Engineering, May 2013, ResearchGate, 24 pages.

Hong et al., "Resource Management in Fog/Edge Computing: A Survey," ACM Computing Surveys, vol. 52, Issue 5, No. 97, Sep. 30, 2019, 22 pages.

Taherizadeh et al., "Monitoring self-adaptive applications within edge computing frameworks: A state-of-the-art review," The Journal of Systems and Software, vol. 136., Feb. 2018, 21 pages.

Yousefpour et al., "All One Needs to Know about Fog Computing and Related Edge Computing Paradigms: A Complete Survey," Journal of Systems Architecture, Aug. 2018, 49 pages.

Brown, "Edge Computing in Service Provider Networks," Advantech, Intel, Heavy Reading Reports, Feb. 2017, 10 pages.

Nvidia Corporation, "Nvidia Jetson Xavier System-on-Module," Jul. 6, 2018, Nvidia, Santa Clara, California, 2014-2018, 71 pages.

United States Patent and Trademark Office, "Non-Final Office Action," issued in connection with U.S. Appl. No. 16/369,036, dated Jul. 30, 2020, 13 pages.

United States Patent and Trademark Office, "Non-Final Office Action," issued in connection with U.S. Appl. No. 16/369,036, dated Feb. 5, 2021, 14 pages.

United States Patent and Trademark Office, "Notice of Allowance," issued in connection with U.S. Appl. No. 16/369,036, dated Jun. 16, 2021, 8 pages.

United States Patent and Trademark Office, "Notice of Allowance," issued in connection with U.S. Appl. No. 16/369,036, dated Sep. 24, 2021, 9 pages.

\* cited by examiner

TECHNOLOGIES FOR DATA MIGRATION BETWEEN EDGE ACCELERATORS HOSTED ON DIFFERENT EDGE LOCATIONS

RELATED APPLICATION

This patent arises from a continuation of U.S. patent application Ser. No. 16/369,036, (now U.S. Pat. No. 11,243, 817) which was filed on Mar. 29, 2019. U.S. patent application Ser. No. 16/369,036 is hereby incorporated herein by reference in its entirety. Priority to U.S. patent application Ser. No. 16/369,036 is hereby claimed.

BACKGROUND

Typically a compute device may execute an application using resources that are local to the compute device, such as a general purpose processor and/or one or more accelerator devices (e.g., devices capable of executing a set of operations faster than the general purpose processor). In some scenarios, a compute device may encounter a section of an application that should be performed within a certain set of parameters (e.g., the section is particularly sensitive to latency, such as a section that is to make decisions based on real time computer vision data, and should be performed within a particular time period) but is unable to satisfy those parameters due to limitations of the compute device. For example, the compute device might not be equipped with a fast enough general purpose processor or an appropriate accelerator device, or the compute device may not have enough energy stored in its battery to execute the section within the specified time period (e.g., utilizing the accelerator device would deplete the remaining energy in the battery).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
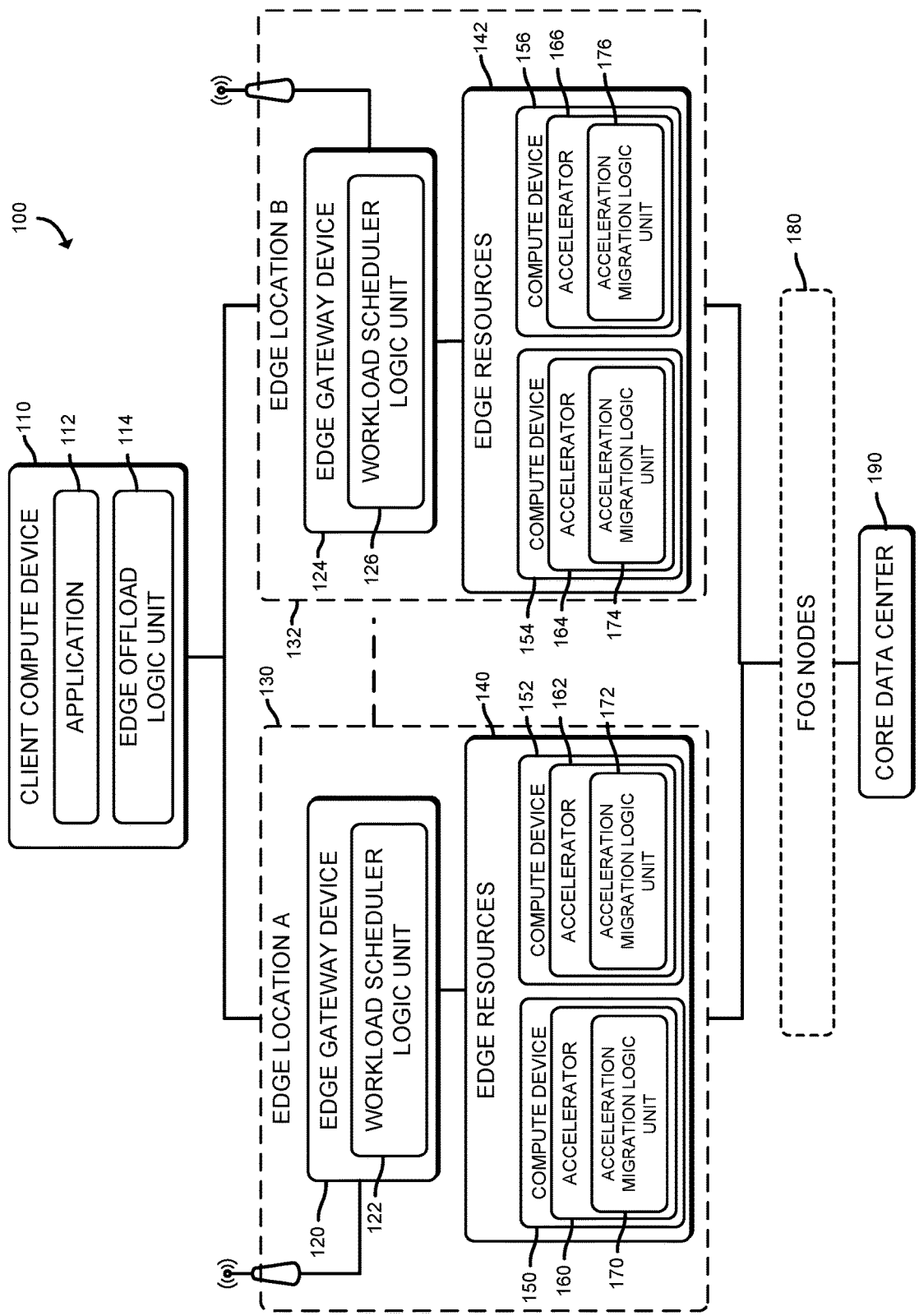
FIG. 1 is a simplified diagram of at least one embodiment of a system for migrating data between edge accelerators hosted on different edge locations.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for migrating between edge accelerators hosted on different edge locations includes a client compute device 110 in communication with one or more edge resources 140, 142 hosted on one or more edge locations 130, 132 via edge gateway devices 120, 124. In use, the client compute device 110 may offload a workload of an application that is to be executed by the client compute device 110 to one or more edge accelerator devices 160, 162, 164, 166 of the edge resources 140, 142 hosted on a present edge location. However, when the edge accelerator device(s) on the present edge location becomes unavailable, the workload may be transferred to different edge accelerator device(s) hosted on different edge location. For example, the edge accelerator device(s) at the present edge location may become unavailable in the presence of a power outage or resource depletion of the present edge network. Alternatively, in some embodiments, as the client compute device 110 travels from the present edge location service area to a next edge location, the service from the present edge location may become unavailable. To transfer the workload between different edge accelerator devices that have different architectures, the accelerator devices 160, 162, 164, 166 may transform the workload data before transmitting it to the next edge accelerator device(s) hosted on different edge locations for continued acceleration. To do so, each accelerator device 160, 162, 164, 166 includes an accelerator migration logic unit 170, 172, 174, 176, which may be embodied as any device or circuitry (e.g., a processor, an application specific integrated circuit (ASIC), reconfigurable circuitry, etc.) capable of transforming workload data into a universal format useable by other edge accelerator(s) of different architectures, transmitting the transformed workload data to another edge location (e.g., a workload scheduler logic unit hosted on the another edge location), and deleting a local copy of the workload data after transmitting the transformed workload data to another edge location. It should be appreciated that transforming workload data into a universal format may include binary translation, compiling or rendering a bitstream, compiling to a different architecture machine code, interpretation by a virtual machine runtime, a container runtime, or a secure environment runtime (e.g., Intel's SGX enclave runtime or TrustZone runtime OS). In some embodiments, a gateway system that implements translation logic that translates data and/or code may be involved during transformation of workload data. In some embodiments, the accelerator migration logic unit 170, 172, 174, 176 may include a checkpoint in metadata of the transformed workload data indicating how much the current accelerator device has processed the workload data, such that the next accelerator device may continue processing the workload data.

Each accelerator device 160, 162, 164, 166 may be embodied as any device or circuitry configured to execute a set of operations. The accelerator device(s) 160, 162, 164, 166 may include one or more field programmable gate arrays (FPGAs), each of which may be embodied as a set (e.g., a matrix) of logic gates that can be configured to perform a set of operations according to a defined configuration (e.g., a bit stream). The accelerator device(s) 160, 162, 164, 166 may additionally or alternatively include a graphics processing unit (GPU), which may be embodied as any device or circuitry (e.g., a programmable logic chip, a processor, etc.) configured to perform graphics-related computations (e.g., matrix multiplication, vector operations, etc.). Additionally or alternatively, the accelerator device(s) 160, 162, 164, 166 may include a vision processing unit (VPU), which may be embodied as any device or circuitry (e.g., a programmable logic chip, a processor, etc.) configured to perform operations related to machine vision, machine learning, and artificial intelligence.

The edge gateway device 120, 124 may be embodied as any device capable of communicating data between the client compute device 110 and one or more edge resources 140, 142 (e.g., resources, such as compute devices and the components thereof, owned and/or operated by one or more service providers, such as cellular network operators) or other compute devices located in a corresponding edge location 130, 132. Further, the edge gateway device 120, 124, in the illustrative embodiment, is configured to receive and respond to requests from the client compute device 110 regarding characteristics of the edge resources 140, 142, such as architectures of processors, accelerator devices, and/or other components in the edge resources 140, 142 (e.g., in compute devices 150, 152, 154, 156), latencies, power usage, and costs (e.g., monetary costs) associated with utilizing those edge resources 140, 142. The edge gateway device 120, 124 and the edge resources 140, 142, in the illustrative embodiment, are positioned at one or more locations (e.g., in small cell(s), base station(s), etc.) along the edge (e.g., in an edge network) of a cloud. However, it should be appreciated that, in some embodiments, one edge gateway device may communicate with edge resources in multiple edge locations.

In the illustrative embodiment, each edge gateway device 120, 124 further includes a workload scheduler logic unit 122, 126. The workload scheduler logic unit 122, 126 may be embodied as any device or circuitry (e.g., a processor, a co-processor, reconfigurable circuitry, a field programmable gate array (FPGA), an application specific integrated circuit (ASIC), or virtualized version thereof, etc.) capable of determining capacity and availability of accelerator devices on a corresponding edge location, determining one or more edge accelerator devices capable and available to perform a workload requested by a requesting device (e.g., a client compute device 110, one or more edge accelerator devices hosted on another edge location, or a workload scheduler logic unit hosted on another edge location), and transmitting the requested workload to the determined edge accelerator (s) at the corresponding edge location. The workload scheduler logic unit 122, 126 may further determine whether to perform data migration between different edge accelerators and send, in response to a determination to perform the data migration, a request to the determined edge accelerator(s) at the corresponding edge location for transformed workload data. As discussed above, the accelerator migration logic unit 170, 172, 174, 176 of the edge accelerator device 160, 162, 164, 166 may transform, in response to a receipt of the migration request from the workload scheduler logic unit 122, 126 of the respective edge location, the requested data from an accelerator-specific format of the current edge accelerator device that is processing the workload to the universal format useable by the one or more accelerator devices of different architectures. This allows the workload to be transferred between different accelerator devices hosted on different edge locations.

In some embodiments, the workload scheduler logic unit 122, 126 may be further configured to perform functional currying to partition large processing tasks of the requested workload into multiple focused functions that are to be distributed close to data sources. By enabling curry function processing close to the data origins, this may reduce unnecessary data transmission costs. It should be appreciated that, although the workload scheduler logic unit 122 is illustrated as part of the edge gateway device 120 in FIG. 1, the workload scheduler logic unit 122 may be located anywhere on the edge network 130 that has at least one accelerator device that is capable of providing acceleration of a workload and capable of transforming the workload. Similarly, although the workload scheduler logic unit 124 is illustrated as part of the edge gateway device 126 in FIG. 1, the workload scheduler logic unit 122 may be located anywhere on the edge network 132. It should be appreciated that, in other embodiments, an edge gateway device may be shared between multiple edge locations. In such embodiments, a workload scheduler logic unit of the shared edge gateway device may communicate with edge resources 140, 142 hosted on different edge locations.

The edge network may be embodied as any type of network that provides edge computing and/or storage resources which are proximately located to radio access network (RAN) capable endpoint devices (e.g., mobile computing devices, Internet of Things (IoT) devices, smart devices, etc.). In other words, the edge network is located at an "edge" between the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Accordingly, the edge network can provide a radio access interface to enterprise applications (e.g., housed in a remote cloud, data center, etc.) and/or other network-based services, as well as bring storage/compute resources closer to the endpoint devices. As some computations/processing can be performed at the edge networks, efficiencies such as reduced latency, bandwidth, etc., can be realized (i.e., relative to such computations/processing being performed at a remote cloud, data center, etc.). Depending on the intended purpose/capabilities of the edge network, the edge network may include one or more edge computing devices, which may include one or more gateways, servers, mobile edge computing (MEC) appliances, etc. It should be appreciated that, in some embodiments, the edge network may form a portion of or otherwise provide an ingress point into a fog network (e.g., fog nodes 180), which may be embodied as a system-level horizontal architecture that distributes resources and services of computing, storage, control and networking anywhere between a core data center 190 (e.g., a data center that is further away from and in a higher level of a hierarchy of the system 100 than the edge resources 140, 142, and that includes multiple compute devices capable of executing one or more services (e.g., processes on behalf of one or more clients)) and an endpoint device (e.g., the client compute device 110).

As discussed in more detail herein, the client compute device 110, in operation, executes an application 112 (e.g., using a processor and/or accelerator device(s)) included in the client compute device 110. Further, in the illustrative embodiment, the client compute device 110 includes an edge offload logic unit 114, which may be embodied as any device or circuitry (e.g., a processor, an application specific integrated circuit (ASIC), reconfigurable circuitry, etc.) configured to determine whether to offload a workload of an application to be executed by the client compute device 110 to one or more accelerator devices 160, 162, 164, 166 of the edge resources 140, 142 at a corresponding edge location.

Figure 2:
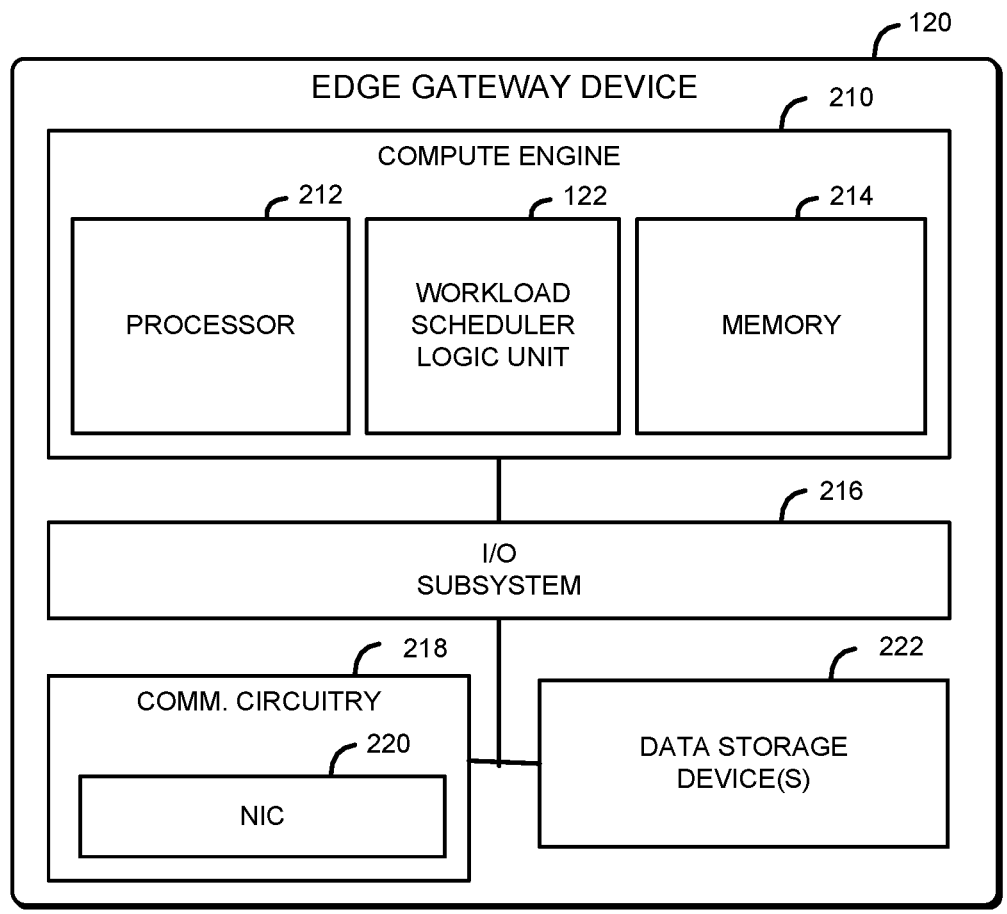
FIG. 2 is a simplified block diagram of at least one embodiment of an edge gateway device included in the system of FIG. 1.

Referring now to FIG. 2, the illustrative edge gateway device 120 includes a compute engine (also referred to herein as "compute engine circuitry") 210, an input/output (I/O) subsystem 216, communication circuitry 218, and one or more data storage devices 222. It should be appreciated that, in other embodiments, the edge gateway device 120 may include other or additional components, such as those commonly found in a computer (e.g., a display, peripheral devices, etc.). Additionally, in some embodiments, one or more of the illustrative components may be incorporated in, or otherwise form a portion of, another component. The compute engine 210 may be embodied as any type of device or collection of devices capable of performing various compute functions described below. In some embodiments, the compute engine 210 may be embodied as a single device such as an integrated circuit, an embedded system, a field-programmable gate array (FPGA), a system-on-a-chip (SOC), or other integrated system or device. In the illustrative embodiment, the compute engine 210 includes or is embodied as a processor 212 and a memory 214. The processor 212 may be embodied as any type of processor capable of performing the functions described herein (e.g., executing one or more sections of the application 112). For example, the processor 212 may be embodied as a multi-core processor(s), a microcontroller, or other processor or processing/controlling circuit. In some embodiments, the processor 212 may be embodied as, include, or be coupled to an FPGA, an application specific integrated circuit (ASIC), reconfigurable hardware or hardware circuitry, or other specialized hardware to facilitate performance of the functions described herein.

As discussed above, the workload scheduler logic unit 122 may be embodied as any device or circuitry (e.g., a processor, an application specific integrated circuit (ASIC), reconfigurable circuitry, etc.) configured to determine capacity and availability of accelerator devices on a corresponding edge location, determine one or more edge accelerator devices capable and available to perform a workload requested by a requesting device (e.g., a client compute device 110, one or more edge accelerator devices hosted on another edge location, or a workload schedule logic unit hosted on another edge location), and transmit the requested workload to the determined edge accelerator(s) at the corresponding edge location. In the illustrative embodiment, the workload scheduler logic unit 122 is further configured to determine whether to perform data migration between different edge accelerators and send, in response to a determination to perform the data migration, a request to the determined edge accelerator(s) at the corresponding edge location for transformed workload data. As discussed above, the accelerator migration logic unit 170, 172, 174, 176 of the edge accelerator device 160, 162, 164, 166 may transform, in response to a receipt of the migration request from the workload scheduler logic unit 122 of the respective edge location, the requested data from an accelerator-specific format of the current edge accelerator device that is processing the workload to the universal format useable by the one or more accelerator devices of different architectures. It should be appreciated that, although FIG. 2 illustrates the workload scheduler logic unit 122 as part of the edge gateway device 120, the workload scheduler logic unit 122 may be located anywhere on the edge network.

The main memory 214 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 214 may be integrated into the processor 212. In operation, the main memory 214 may store various software and data used during operation such as one or more applications (the application 112), data operated on by the application(s), libraries, and drivers.

The compute engine 210 is communicatively coupled to other components of the edge gateway device 120 via the I/O subsystem 216, which may be embodied as circuitry and/or components to facilitate input/output operations with the compute engine 210 (e.g., with the processor 212 and/or the main memory 214) and other components of the edge gateway device 120. For example, the I/O subsystem 216 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 216 may form a portion of a system-on-a-chip (SoC) and be incorporated, along with one or more of the processor 212, the main memory 214, and other components of the edge gateway device 120, into the compute engine 210.

The communication circuitry 218 may be embodied as any communication circuit, device, or collection thereof, capable of enabling communications over a network between the edge gateway device 120 and another compute device (e.g., the edge gateway device 120, the edge resources 140, 142, etc.). The communication circuitry 218 may be configured to use any one or more communication technology (e.g., wired or wireless communications) and associated protocols (e.g., a cellular networking protocol, Wi-Fi®, WiMAX, Ethernet, Bluetooth®, etc.) to effect such communication.

The illustrative communication circuitry 218 includes a network interface controller (NIC) 220, which may also be referred to as a host fabric interface (HFI). It should be appreciated that, in some embodiments, the NIC and the HFI may be embodied as different types of network interfaces. The NIC 220 may be embodied as one or more add-in-boards, daughter cards, network interface cards, controller chips, chipsets, or other devices that may be used by the edge gateway device 120 to connect with another compute device (e.g., the edge gateway device 120, the edge resources 140, 142, etc.). In some embodiments, the NIC 220 may be embodied as part of a system-on-a-chip (SoC) that includes one or more processors, or included on a multichip package that also contains one or more processors. In some embodiments, the NIC 220 may include a local processor (not shown) and/or a local memory (not shown) that are both local to the NIC 220. In such embodiments, the local processor of the NIC 220 may be capable of performing one or more of the functions of the compute engine 210 described herein. Additionally or alternatively, in such embodiments, the local memory of the NIC 220 may be integrated into one or more components of the edge gateway device 120 at the board level, socket level, chip level, and/or other levels.

The one or more illustrative data storage devices 222 may be embodied as any type of devices configured for short-term or long-term storage of data such as, for example, memory devices and circuits, memory cards, hard disk drives, solid-state drives, or other data storage devices. Each data storage device 222 may include a system partition that stores data and firmware code for the data storage device 222. Each data storage device 222 may also include one or more operating system partitions that store data files and executables for operating systems.

It should be appreciated that the description of those components of the edge gateway device 120 is equally applicable to the description of components of the edge gateway device 124, with exception that the edge gateway device 124 includes the workload scheduler logic unit 126 instead of the workload scheduler logic unit 122. Additionally, the client compute device 110, the edge resources 140, 142, the compute devices 150, 152, 154, 156, the fog nodes 180, and the core data center 190 may have components similar to those described in FIG. 2 with reference to the edge gateway device 120, except the workload scheduler logic unit 122. The description of those components of the edge compute device 150 is equally applicable to the description of components of the client compute device 110, the edge resources 140, 142, the compute devices 150, 152, 154, 156, the fog nodes 180, and the core data center 190, with the exception that, in some embodiments, the edge offload logic unit 114 is included in the client compute device 110, and the acceleration migration logic unit 170, 172, 174, 176 is included in the accelerator device 160, 162, 164, 166 of the compute devices 150, 152, 154, 156. Further, it should be appreciated that any of the client compute device 110, the edge resources 140, 142, the fog nodes 180, and the core data center 190 may include other components, sub-components, and devices commonly found in a computing device, which are not discussed above in reference to the edge gateway device 120 and not discussed herein for clarity of the description. Further, it should be understood that one or more components of a compute device may be distributed across any distance, and are not necessarily housed in the same physical unit.

The client compute device 110, the edge resources 140, 142 (e.g., the compute devices 150, 152, 154, 156), the edge gateway device 120, the fog nodes 180, and the core data center 190 are illustratively in communication via a network, which may be embodied as any type of wired or wireless communication network, or hybrids or combinations thereof, including global networks (e.g., the Internet), local area networks (LANs) or wide area networks (WANs), an edge network, a fog network, cellular networks (e.g., Global System for Mobile Communications (GSM), 3G, Long Term Evolution (LTE), Worldwide Interoperability for Microwave Access (WiMAX), etc.), a radio access network (RAN), digital subscriber line (DSL) networks, cable networks (e.g., coaxial networks, fiber networks, etc.), or any combination thereof.

Figure 3:
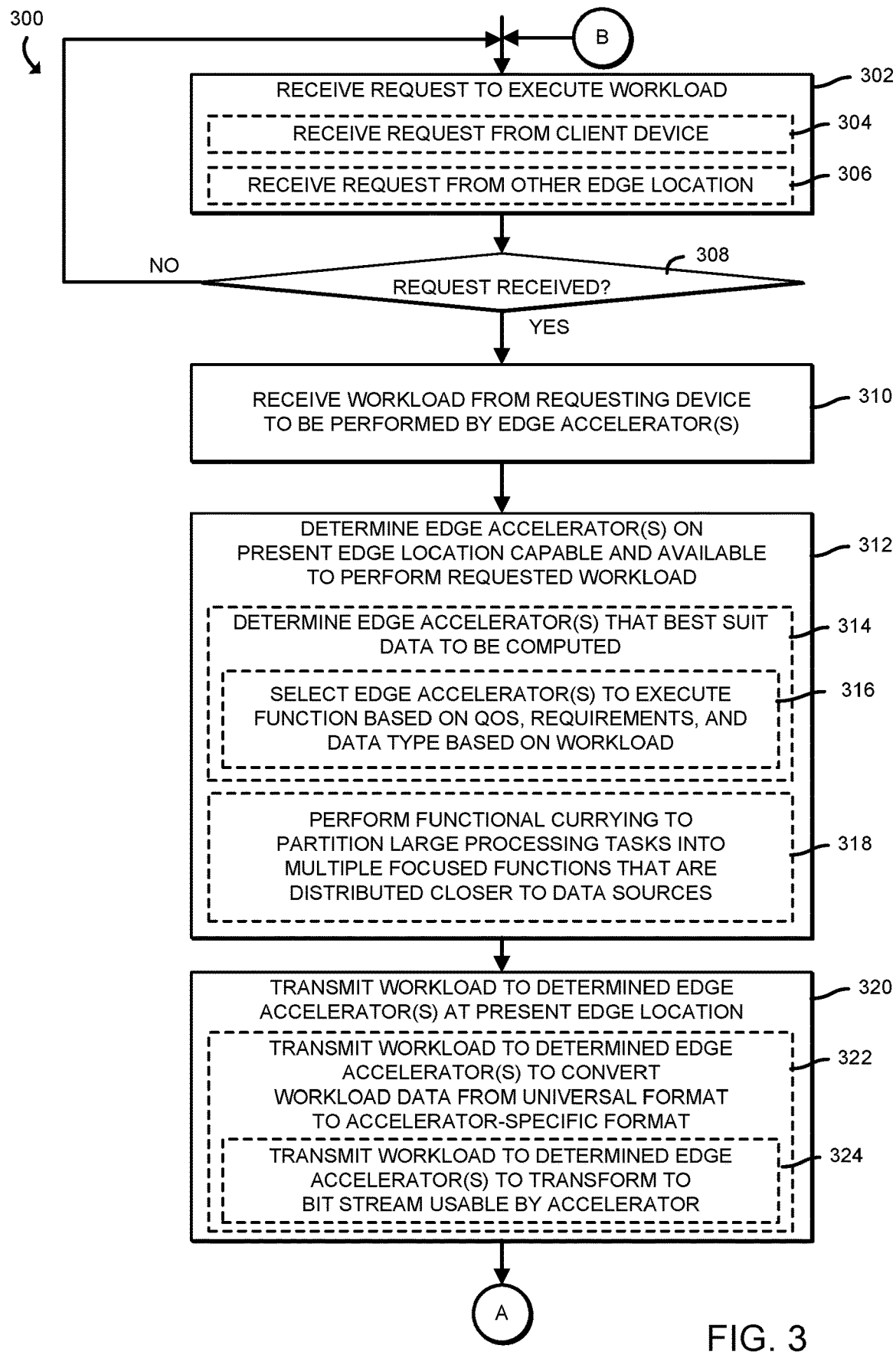
FIGS. 3-4 are a simplified block diagram of at least one embodiment of a method that may be performed by a workload scheduler logic unit of FIG. 1 for migrating data from one or more edge accelerators hosted on one edge location to one or more edge accelerators hosted on a different edge location.
Figure 4:
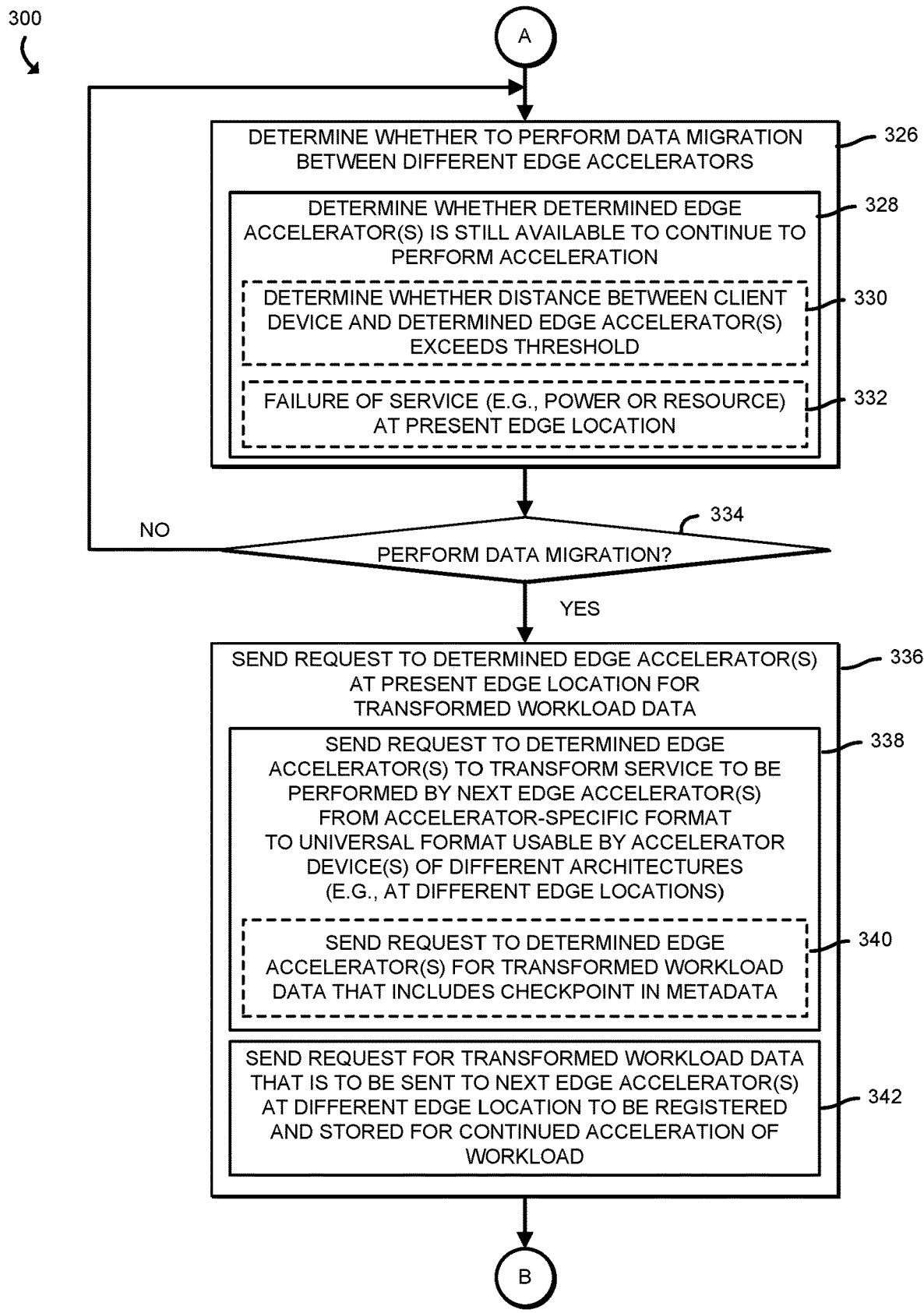

Referring now to FIGS. 3 and 4, the workload scheduler logic unit 122 located at an edge of a network, in operation, may execute a method 300 for migrating data from one or more edge accelerators (e.g., the accelerators 160, 162) hosted on one edge location (e.g., the edge location 130) to one or more edge accelerators (e.g., the accelerators 164, 166) hosted on a different edge location (e.g., the edge location 132). As discussed above, in the illustrative embodiment, the workload scheduler logic unit 122 is embodied as part of the edge gateway device 120; however, in some embodiments, the workload scheduler logic unit 122 may be located anywhere on the edge location that has at least one accelerator device that is capable of providing acceleration and migration of workload(s). The method 300 begins with block 302, in which the workload scheduler logic unit 122 receives a request to execute a workload. For example, in some embodiments, the workload scheduler logic unit 122 may receive a request from a client compute device 110. Alternatively, the workload scheduler logic unit 122 may receive a request from another edge location. For example, as discussed in detail below, as the client compute device 110 travels from one edge location to another, the workload scheduler logic unit 122 of the present edge location may receive a request from one or more edge accelerators that were executing a requested workload at the previous edge location for continued acceleration of the requested workload. It should be appreciated that, in some embodiments, the request may be sent from a workload scheduler logic unit of the previous edge location.

If the workload scheduler logic unit 122 determines that a request has not been received in block 308, the method 300 loops back to block 302 to continue await a request to execute a workload. If, however, the workload scheduler logic unit 122 determines that a request has been received, the method 300 advances to block 310.

In block 310, the workload scheduler logic unit 122 receives a workload from the requesting device that is to be performed by one or more edge accelerators 160, 162 on the present edge location 130. For example, as discussed above, the requesting device may be the client compute device 110, one or more accelerators located at the previous edge location, or a workload scheduler logic unit of the previous edge location.

In block 312, the workload scheduler logic unit 122 determines one or more edge accelerators 160, 162 on the present edge location 130 capable and available to perform the requested workload. To do so, the workload scheduler logic unit 122 may determine one or more edge accelerators 160, 162 that are best suited to compute the workload data, as indicated in block 316. In some embodiments, the workload scheduler logic unit 122 may select one or more the edge accelerators 160, 162 to execute a function in the workload based on a quality of service (QoS), compute requirements, and a data type of the requested workload. Additionally or alternatively, in some embodiments, as indicated in block 318, the workload scheduler logic unit 122 may perform functional currying to partition large processing tasks of the requested workload into multiple focused functions that are distributed closer to data sources.

Subsequently, in block 320, the workload scheduler logic unit 122 transmits the requested workload to the determined edge accelerator(s) 160, 162 at the present edge location 130. To do so, the workload scheduler logic unit 122 may transmit the requested workload to the determined edge accelerator(s) 160, 162 to convert the workload data from a universal format to an accelerator-specific format, as indicated in block 322. For example, if the determined edge accelerator 160, 162 is a field-programmable gate array (FPGA), the FPGA may transform the workload data to a bit stream usable by the FPGA, as indicated in block 324.

While the determined edge accelerator(s) 160, 162 are processing the requested workload, the workload scheduler logic unit 122 determines whether data migration between different edge accelerators on different edge locations is required, as indicated in block 326. For example, the workload scheduler logic unit 122 may determine to perform the data migration if the determined edge accelerator(s) 160, 162 is not available to continue to perform the acceleration of the requested workload. To do so, in block 328, the workload scheduler logic unit 122 determines whether the current edge accelerator(s) 160, 162 is still available to continue to perform the acceleration of the requested workload. In some embodiments, the workload scheduler logic unit 122 may determine whether a distance between the client compute device 110 and the current edge accelerator(s) 160, 162 exceeds a predefined threshold, as indicated in block 330. If the distance exceeds the predefined threshold, the workload scheduler logic unit 122 determines that the client compute device 110 is not within a service area covered by the present edge location 130. Additionally or alternatively, the workload scheduler logic unit 122 may further determine whether there is a failure of service at the present edge location 130, as indicated in block 332. For example, the failure of service may include a power outage or resource depletion.

If the workload scheduler logic unit 122 determines not to perform the data migration in block 334, the method 300 loops back to block 326 to continue determining whether to perform the data migration. If, however, the workload scheduler logic unit 122 determines to perform the data migration (e.g., in response to determination that the distance between the client compute device 110 and the current edge accelerator(s) 160, 162 exceeds the predefined threshold or a failure of service at the present edge location 130), the method 300 advances to block 336.

In block 336, the workload scheduler logic unit 122 sends a request to the determined edge accelerator(s) 160, 162 at the present edge location 130 that is currently executing the requested workload for transformed workload data. For example, the workload scheduler logic unit 122 sends a request to the determined edge accelerator(s) 160, 162 to transform the workload data to be performed by the next edge accelerator(s) from the accelerator-specific format of the determined edge accelerator to the universal format useable by the edge accelerator(s) of different architectures, as indicated in block 338. It should be appreciated that the edge accelerators at different edge locations may have different architectures. In some embodiments, the determined (i.e., the current) edge accelerator 160, 162 of the present edge location 130 may include a checkpoint in the metadata when transforming the workload data, as indicated in block 340. The checkpoint indicates where the current edge accelerator 160, 162 has left off In other words, as indicated in block 342, the workload scheduler logic unit 122 sends a request for the transformed workload data that is to be sent to one or more next edge accelerators at the different edge location (e.g., based on the present location of the client compute device 110) to be registered and stored for continued acceleration of the requested workload. It should be appreciated that, in some embodiments, a local copy of the workload data is deleted once the transformed workload data is transmitted to another edge location (e.g., the edge location 132).

Figure 5:
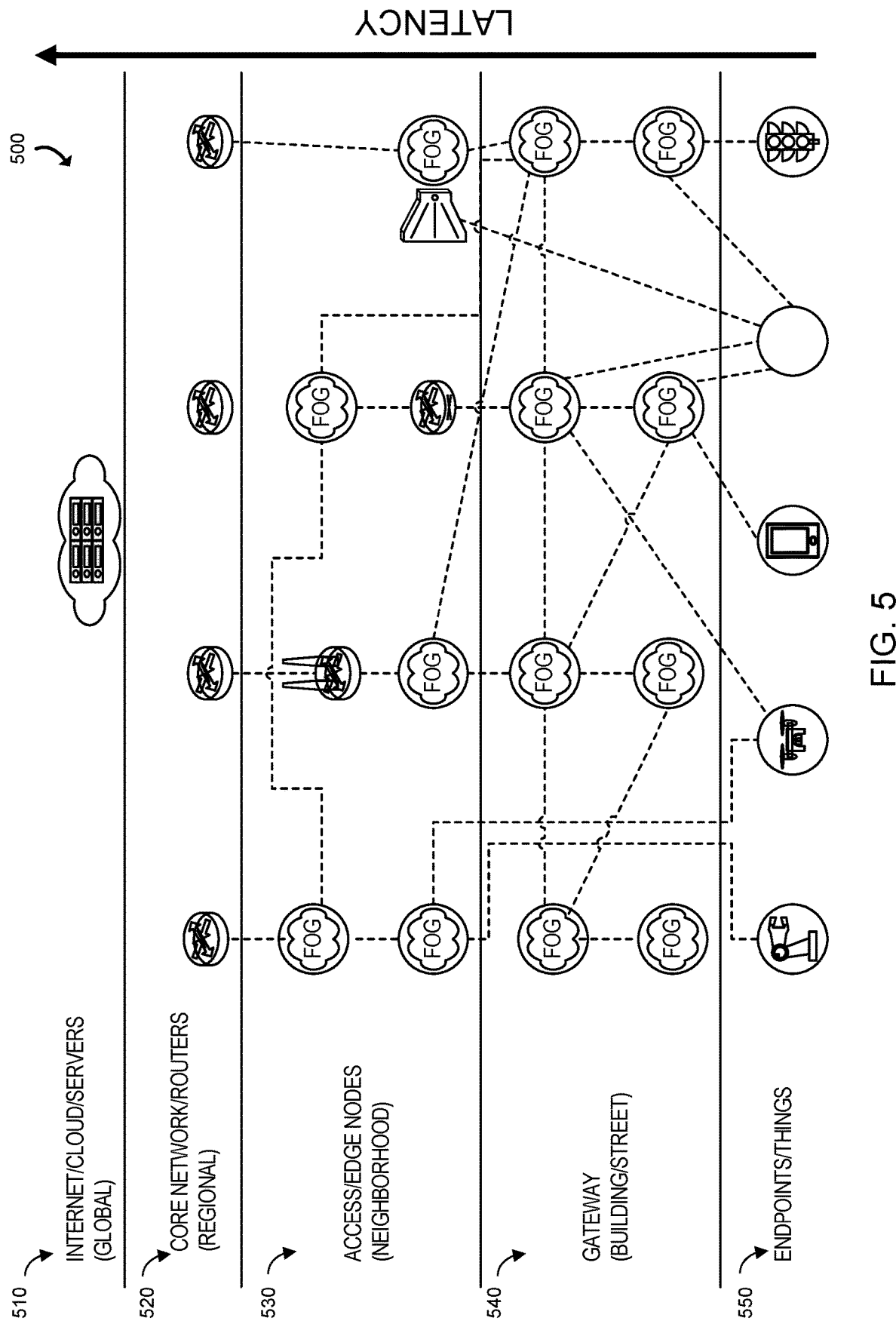
FIG. 5 is a simplified block diagram of a fog and mobile edge computing (MEC) network topology that may be utilized with the system of FIG. 1.

Referring briefly to FIG. 5, a MEC and fog network topology 500 is shown. The network topology 500 includes endpoints (at an endpoints/things network layer 550), gateways (at a gateway layer 540), access or edge computing nodes (e.g., at neighborhood nodes layer 530), core network or routers (e.g., at a regional or central office layer 520). A fog network (e.g., established at the gateway layer 540) may represent a dense geographical distribution of near-user edge devices (e.g., fog nodes), equipped with storage capabilities (e.g., to avoid the need to store data in cloud data centers), communication capabilities (e.g., rather than routed over an internet backbone), control capabilities, configuration capabilities, measurement and management capabilities (rather than controlled primarily by network gateways such as those in an LTE core network), among others. In this context, FIG. 5 illustrates a general architecture that integrates a number of MEC and fog nodes—categorized in different layers (based on their position, connectivity and processing capabilities, etc.). It will be understood, however, that such fog nodes may be replaced or augmented by edge computing processing nodes.

Fog nodes may be categorized depending on the topology and the layer where they are located. In contrast, from a MEC standard perspective, each fog node may be considered as a mobile edge (ME) Host, or a simple entity hosting a ME app and a light-weighted ME Platform. In an example, a MEC or fog node may be defined as an application instance, connected to or running on a device (ME Host) that is hosting a ME Platform. As such, the application may consume MEC services and be associated to a ME Host in the system. The nodes may be migrated, associated to different ME Hosts, or consume MEC services from other (e.g., local or remote) ME platforms.

In contrast to using the edge, as described above, a traditional application may rely on remote cloud data storage and processing to exchange and coordinate information. A cloud data arrangement allows for long-term data collection and storage, but is not optimal for highly time varying data and may fail in attempting to meet latency challenges (e.g., stopping a vehicle when a child runs into the street). The use of the edge resources as described above enables providing services (e.g., execution of functions) in a low-latency manner, and, in some embodiments, may utilize features in existing MEC services that provide minimal overhead.

In addition to the MEC implementation described above, it should be appreciated that the foregoing systems and methods may implemented in any environment (e.g., smart factories, smart cities, smart buildings, and the like) in which the devices are arranged and interoperate in a manner similar to that described with reference to FIG. 1, though the names of the individual devices may differ from one implementation to the next. For example, in a smart factory, the above systems and methods may improve the accuracy, efficiency, and/or safety with which one or more manufacturing operations are performed, particularly in instances in which the operations are to be performed in real time or near real time (e.g., in which low latency is of high importance). In a smart city, the above systems and methods may improve the accuracy, efficiency, and/or safety in the operation of traffic control systems, environmental monitoring systems, and/or other automated or semi-automated systems. Likewise, in a smart building, the above disclosure may applied to improve the operations of any systems that rely on sensors to collect and act upon the collected information (e.g., threat detection and evacuation management systems, video monitoring systems, elevator control systems, etc.).

EXAMPLES

Illustrative examples of the technologies disclosed herein are provided below. An embodiment of the technologies may include any one or more, and any combination of, the examples described below.

Example 1 includes a computing device hosted on a present edge location comprising one or more processors to receive a workload from a requesting device; determine one or more accelerator devices hosted on the present edge location to perform the workload; transmit the workload to the one or more accelerator devices to process the workload; determine whether to perform data migration from the one or more accelerator devices to one or more different edge accelerator devices hosted on a different edge location; and send, in response to a determination to perform the data migration, a request to the one or more accelerator devices on the present edge location for transformed workload data to be processed by the one or more different edge accelerator devices.

Example 2 includes the subject matter of Example 1, and wherein the one or more processors are further to receive a request to execute the workload from the requesting device, wherein the requesting device is a client compute device or a device hosted outside of the present edge location.

Example 3 includes the subject matter of any of Examples 1 and 2, and wherein to determine the one or more accelerator devices hosted on the present edge location to perform the workload comprises to select one or more accelerator devices on the present edge location based on at least one of a quality of service, compute requirements, and a data type of the workload.

Example 4 includes the subject matter of any of Examples 1-3, and wherein to determine the one or more accelerator devices hosted on the present edge location to perform the workload comprises to perform functional currying to partition large processing tasks into multiple focused functions.

Example 5 includes the subject matter of any of Examples 1-4, and wherein to transmit the workload to the one or more accelerator devices comprises to transmit the workload to the one or more accelerator devices to convert the workload from a universal format to an accelerator-specific format.

Example 6 includes the subject matter of any of Examples 1-5, and wherein the one or more accelerator devices are field programmable gate arrays (FPGAs), wherein to transmit the workload to the one or more accelerator devices to convert the workload from a universal format to an accelerator-specific format comprises to transmit the workload to the one or more accelerator devices to transform the workload to a bit stream usable by a field programmable gate array (FPGA).

Example 7 includes the subject matter of any of Examples 1-6, and wherein to determine whether to perform data migration comprises to determine whether the one or more accelerator devices are available to continue to perform acceleration of the workload.

Example 8 includes the subject matter of any of Examples 1-7, and wherein to determine whether the one or more accelerator devices are available to continue to perform acceleration of the workload comprises to determine whether a distance between a client compute device and the one or more accelerator devices exceeds a predefined threshold.

Example 9 includes the subject matter of any of Examples 1-8, and wherein to determine whether the one or more accelerator devices are available to continue to perform acceleration of the workload comprises to determine a presence of failure of service at the present edge location.

Example 10 includes one or more machine-readable storage media comprising a plurality of instructions stored thereon that, after being prepared for execution, cause a computing device hosted on a present edge location that executes the prepared instructions to receive a workload from a requesting device; determine one or more accelerator devices hosted on the present edge location to perform the workload; transmit the workload to the one or more accelerator devices to process the workload; determine whether to perform data migration from the one or more accelerator devices to one or more different edge accelerator devices hosted on a different edge location; and send, in response to a determination to perform the data migration, a request to the one or more accelerator devices on the present edge location for transformed workload data to be processed by the one or more different edge accelerator devices.

Example 11 includes the subject matter of Example 10, and further including a plurality of instructions that in response to being executed cause the computing device to receive a request to execute the workload from the requesting device, wherein the requesting device is a client compute device or a device hosted outside of the present edge location.

Example 12 includes the subject matter of any of Examples 10 and 11, and wherein to determine the one or more accelerator devices hosted on the present edge location to perform the workload comprises to select one or more accelerator devices on the present edge location based on at least one of a quality of service, compute requirements, and a data type of the workload.

Example 13 includes the subject matter of any of Examples 10-12, and wherein to determine the one or more accelerator devices hosted on the present edge location to perform the workload comprises to perform functional currying to partition large processing tasks into multiple focused functions.

Example 14 includes the subject matter of any of Examples 10-13, and wherein to transmit the workload to the one or more accelerator devices comprises to transmit the workload to the one or more accelerator devices to convert the workload from a universal format to an accelerator-specific format.

Example 15 includes the subject matter of any of Examples 10-14, and wherein the one or more accelerator devices are field programmable gate arrays (FPGAs), wherein to transmit the workload to the one or more accelerator devices to convert the workload from a universal format to an accelerator-specific format comprises to transmit the workload to the one or more accelerator devices to transform the workload to a bit stream usable by a field programmable gate array (FPGA).

Example 16 includes the subject matter of any of Examples 10-15, and wherein to determine whether to perform data migration comprises to determine whether the one or more accelerator devices are available to continue to perform acceleration of the workload.

Example 17 includes the subject matter of any of Examples 10-16, and wherein to determine whether the one or more accelerator devices are available to continue to perform acceleration of the workload comprises to determine whether a distance between a client compute device and the one or more accelerator devices exceeds a predefined threshold.

Example 18 includes the subject matter of any of Examples 10-17, and wherein to determine whether the one or more accelerator devices are available to continue to perform acceleration of the workload comprises to determine a presence of failure of service at the present edge location.

Example 19 includes the subject matter of any of Examples 10-18, and wherein to send the request to the one or more accelerator devices on the present edge location for transformed workload data comprises to send a request to the one or more accelerator devices on the present edge location for transformed workload data to be sent to the one or more different edge accelerator devices hosted on a different edge location different than the present edge location for continued acceleration of the workload.

Example 20 includes a method comprising receiving, by a computing device hosted on a present edge location, a workload from a requesting device; determining, by the computing device, one or more accelerator devices hosted on the present edge location to perform the workload; transmitting, by the computing device, the workload to the one or more accelerator devices to process the workload; determining, by the computing device, whether to perform data migration from the one or more accelerator devices to one or more different edge accelerator devices hosted on a different edge location; and sending, in response to determining to perform the data migration and by the computing device, a request to the one or more accelerator devices on the present edge location for transformed workload data to be processed by the one or more different edge accelerator devices.

What is claimed is:

1. An accelerator device comprising:
   first accelerator circuitry to execute a workload offloaded from a client compute device to the accelerator device, the client compute device to communicate with a first compute device at a first network location, the first compute device including the accelerator device; and
   acceleration migration logic circuitry to:
      convert the workload from a first format to a second format, the first format specific to the first accelerator circuitry; and
      cause transmission of the workload to a second compute device at a second network location, the workload in the second format, the transmission to cause the second compute device to convert the workload from the second format to a third format that is specific to second accelerator circuitry of the second compute device.

2. The accelerator device of claim 1, wherein the acceleration migration logic circuitry is to cause deletion of the workload at the first compute device based on transmission of the workload to the second compute device.

3. The accelerator device of claim 1, wherein the acceleration migration logic circuitry is to include a checkpoint in metadata of the workload, the checkpoint indicative of an amount of the workload that was processed by the first accelerator circuitry.

4. The accelerator device of claim 1, wherein the acceleration migration logic circuitry is to convert the workload from the first format to the second format based on depletion of resources at the first network location.

5. The accelerator device of claim 1, wherein the acceleration migration logic circuitry is to convert the workload from the first format to the second format based on power instability at the first network location.

6. The accelerator device of claim 1, wherein the acceleration migration logic circuitry is to convert the workload from the first format to the second format based on travel of the client compute device from the first network location to the second network location.

7. The accelerator device of claim 1, wherein the first format is specific to a first architecture of the first accelerator circuitry, and the second format is useable by second accelerator circuitry having a second architecture different from the first architecture.

8. The accelerator device of claim 1, wherein to convert the workload from the first format to the second format, the acceleration migration logic circuitry is to perform a binary translation of the workload from the first format to the second format.

9. The accelerator device of claim 1, wherein to convert the workload from the first format to the second format, the acceleration migration logic circuitry is to at least one of compile, render, or translate a bitstream of the workload.

10. The accelerator device of claim 1, wherein to convert the workload from the first format to the second format, the acceleration migration logic circuitry is to interpret the workload with at least one of a virtual machine runtime, a container runtime, or a secure environment runtime.

11. The accelerator device of claim 1, wherein to convert the workload from the first format to the second format, the acceleration migration logic circuitry is to compile the workload into machine code that corresponds to a different architecture than a first architecture of the first accelerator circuitry.

12. The accelerator device of claim 1, wherein the first accelerator circuitry includes at least one of a field programmable gate array, a graphics processing unit, or a vision processing unit.

13. The accelerator device of claim 1, wherein the acceleration migration logic circuitry is to communicate with communication circuitry of the first compute device, the communication circuitry to transmit the workload to the second compute device.

14. At least one storage device or storage disk comprising instructions which, when executed, cause processor circuitry to:
convert a workload from a first format to a second format, the first format specific to first accelerator circuitry, the workload offloaded from a client compute device to a first compute device at a first network location, the client compute device to communicate with the first compute device; and
cause transmission of the workload to a second compute device at a second network location, the workload in the second format, the transmission to cause the second compute device to convert the workload from the second format to a third format that is specific to second accelerator circuitry of the second compute device.

15. The at least one storage device or storage disk of claim 14, wherein the first compute device includes the first accelerator circuitry, and the instructions, when executed, cause the processor circuitry to include preliminary instructions with the workload, the preliminary instructions specifying an amount of the workload that was processed by the first accelerator circuitry.

16. The at least one storage device or storage disk of claim 14, wherein to convert the workload from the first format to the second format, the instructions, when executed, cause the processor circuitry to perform a binary translation of the workload from the first format to the second format.

17. The at least one storage device or storage disk of claim 14, wherein to convert the workload from the first format to the second format, the instructions, when executed, cause the processor circuitry to at least one of compile, render, or translate a bitstream of the workload.

18. The at least one storage device or storage disk of claim 14, wherein to convert the workload from the first format to the second format, the instructions, when executed, cause the processor circuitry to interpret the workload with at least one of a virtual machine runtime, a container runtime, or a secure environment runtime.

19. The at least one storage device or storage disk of claim 14, wherein the first compute device includes the first accelerator circuitry, and to convert the workload from the first format to the second format, the instructions, when executed, cause the processor circuitry to compile the workload into machine code that corresponds to a different architecture than a first architecture of the first accelerator circuitry.

20. A method comprising:
converting, by executing an instruction with processor circuitry of a first compute device at a first network location, a workload from a first format to a second format, the first format specific to first accelerator circuitry, the workload offloaded from a client compute device to the first compute device, the client compute device to communicate with the first compute device; and
transmitting, by executing an instruction with the processor circuitry, the workload to a second compute device at a second network location, the workload in the second format, the transmitting to cause the second compute device to convert the workload from the second format to a third format that is specific to second accelerator circuitry of the second compute device.

21. The method of claim 20, wherein the first compute device includes the first accelerator circuitry, and the method further includes adding a checkpoint in metadata of the workload, the checkpoint indicative of an amount of the workload that was processed by the first accelerator circuitry.

22. The method of claim 20, wherein converting the workload from the first format to the second format includes performing a binary translation of the workload from the first format to the second format.

23. The method of claim 20, wherein converting the workload from the first format to the second format includes at least one of compiling, rendering, or translating a bitstream of the workload.

24. The method of claim 20, wherein the first compute device includes the first accelerator circuitry, and converting the workload from the first format to the second format includes compiling the workload into machine code that corresponds to a different architecture than a first architecture of the first accelerator circuitry.

\* \* \* \* \*